(No Model.)
H. SAWYER.
SWITCH FOR CONTROLLING ELECTRIC MOTORS.
No. 505,064. Patented Sept. 12, 1893.
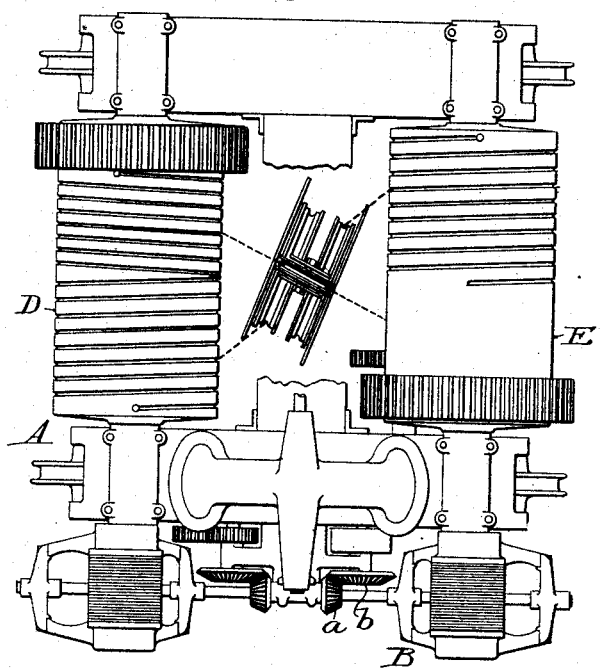
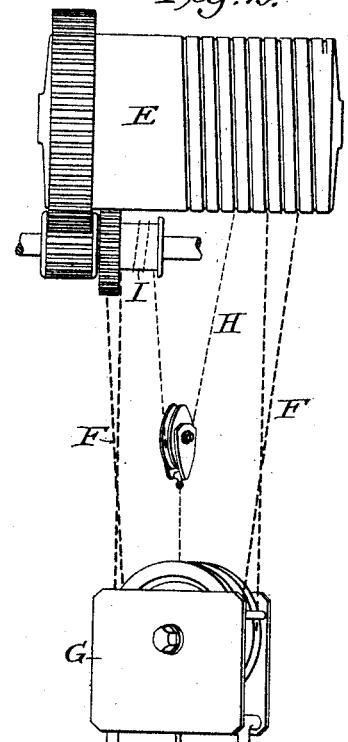
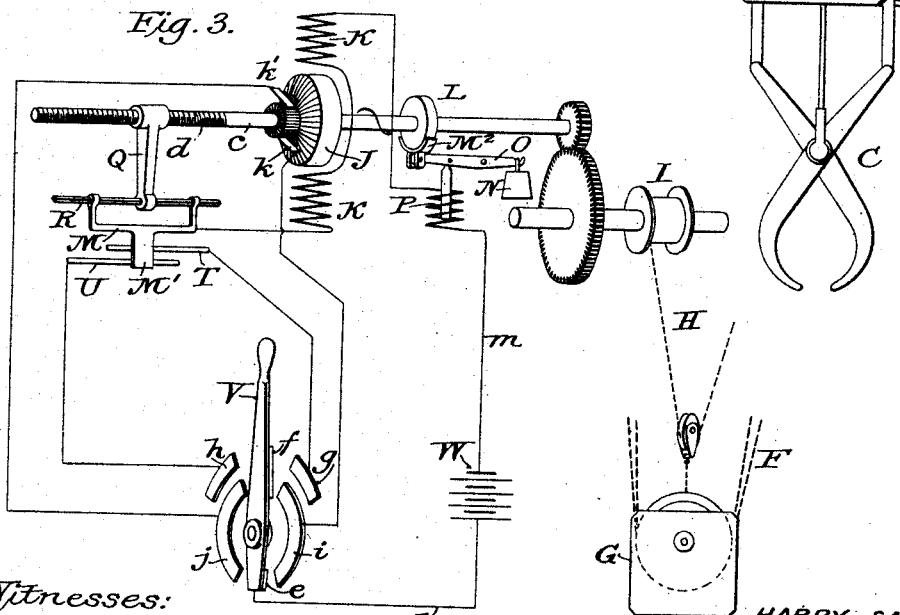
Witnesses:
James F. Duhamel
Horace A. Dodge.
HARRY SAWYER,
Inventor,
by Dodge & Son,
Atty.

UNITED STATES PATENT OFFICE.

HARRY SAWYER, OF MUSKEGON, MICHIGAN, ASSIGNOR TO THE SHAW ELECTRIC CRANE COMPANY, OF SAME PLACE.

SWITCH FOR CONTROLLING ELECTRIC MOTORS.

SPECIFICATION forming part of Letters Patent No. 505,064, dated September 12, 1893.

Application filed February 20, 1893. Serial No. 463,106. (No model.)

*To all whom it may concern:*

Be it known that I, HARRY SAWYER, a citizen of the United States, residing at Muskegon, in the county of Muskegon and State of Michigan, have invented certain new and useful Improvements in Switches for Controlling Electric Motors, of which the following is a specification.

My invention relates to the employment of electric motors in situations involving or permitting but limited movement in either direction; and it is designed to guard against accidental overrunning.

The invention consists in a novel construction and arrangement of switches, whereby the current of the electric motor is controlled.

For purposes of illustration and explanation I show the invention as applied to the tongs-actuating mechanism of an electric crane or hoist, for which class of machinery it is primarily intended.

In the drawings annexed,—Figure 1 is a top plan view of the trolley of an electric crane, embodying my invention; Fig. 2, a view illustrating the preferred arrangement of the tongs-actuating or controlling mechanism; Fig. 3 a diagrammatic view of the parts to which the invention especially pertains.

In the description which follows, it is to be understood that the trolley frame stands for the frame work of any form of hoisting machinery, movable or fixed; and that the tongs and their opening-and-closing mechanism stand for trip devices generally, whether of tongs, scoops, ladles or the like.

A indicates a trolley designed to travel upon the bridge of a traveling crane, and furnished with an electric motor B for actuating the trip device of tongs C or other carrier.

D and E indicate two hoisting drums, designed to wind on and off the opposite ends of a chain or cable F, which, at its mid-length is either made fast to the frame A, or is carried over an intermediate idler pulley, the two loops thus formed passing about the pulleys of a double running block G.

H indicates a secondary cable, chain or band, one end of which winds on or off one of the hoisting drums D, E, simultaneously and equally with the hoisting cable, while the other end of the secondary cable is attached to and winds upon a secondary drum I. The secondary drum I remains at rest at all times except when it is desired to actuate the trip device or the tongs; hence it follows from what has been said that the secondary chain is neither permitted to become materially slackened, nor subjected to strain, except when the secondary drum is rotated. The drum I is rotated, when necessary, by the electric motor B, above referred to, a small pinion $a$ on the motor shaft meshing with a gear wheel $b$ on the shaft of drum I, or other suitable connection being employed.

J, Fig. 3, indicates the armature of the motor, K the field, L a brake drum on the armature shaft, M a brake shoe held against drum L by a weight N, acting through a lever O, and P is a solenoid or other form of electro magnet, arranged to act upon the lever O and to withdraw the brake shoe from drum L whenever a current is passing through the magnet helix. The shaft $c$ of the motor is prolonged at one end, and furnished with a screw thread $d$, as shown in Fig. 3.

Q indicates an arm, tapped to fit the screw thread $d$, by which the arm is caused to travel lengthwise of the screw as the latter rotates; the arm being guided and prevented from rotating with the screw by means of a guide rod R, from which it is insulated.

M is a switch, made in the form of a yoke and arranged to slide upon the guide rod R, the arm Q encircling said rod between two arms of the yoke of the switch, as shown. Sufficient space is left between the arms of the yoke to permit a proper travel of arm Q without affecting the switch, after which the arm Q, engaging the yoke, moves it along the rod R, this same action occurring in opposite directions alternately.

The switch yoke is formed with a tongue M', which normally bears upon two metallic bars T and U, and bridges the space between them. The strips T and U, are, however, offset, or extend to different points in the length of travel of tongue M', so that said tongue will ride off one or the other bar before reaching the limit of its possible travel in either direction.

V indicates a manual switch lever carrying insulated contact blocks $e$ and $f$ which move upon switch segments $g$ and $h$, and $i$ and $j$. The segments $g$ and $h$ are electrically connected to contact strips T and U respectively, and segments $i$ and $j$ are connected, each to one of the commutator brushes $k$, $k'$ of the motor B.

W indicates a source of electric energy, which may be a battery, a dynamo electric generator, or any equivalent thereof. From the positive pole of the generator W, a conductor $l$ extends to and connects with the block $e$ of the switch lever V, and from the negative pole thereof a conductor $m$ extends to and connects with the yoke or switch M, including in its length the helix of electro magnet P, and the fields K of the motor B.

The operation is as follows: To draw upon the trip chain and trip the tongs or other carrier, the lever V is moved in the direction indicated by the arrow thereon. Contact block $e$, connected with the positive pole of the generator, is thus placed in contact with segment $j$, and contact block $f$ is placed in contact with segments $g$ and $i$. This completes the circuit, and causes the current to pass by conductor $l$ from the positive pole of the generator, through contact block $e$, segment $j$, and conductor to commutator brush $k$, through the armature to the second commutator brush $k'$, thence to segment $i$, through contact block $f$ to segment $g$, thence by conductor to contact strip or bar T, to switch yoke M, thence by conductor $m$ to the motor fields K, thence to the helix of electro-magnet or solenoid P and back to the negative pole of the generator or source of electric energy. The electro-magnet or solenoid, being energized, acts upon lever O and withdraws the brake shoe M from drum L, and the armature rotates in the direction indicated by the arrow. This causes drum I to wind on the trip chain or cable H, and to actuate the tongs or trip. Should the operator fail to return the operating lever to an intermediate position between the two series of segments and to thereby interrupt the motor circuit a slight over travel of the arm Q, due to rotation of screw $d$, will cause the switch M to move along guide rod R until its tongue M' rides off and out of contact with contact strip or bar T, when the contact will be destroyed. The circuit being thus interrupted, the motor current is cut off, and the armature will rotate only by reason of its acquired momentum, which is promptly overcome by the brake shoe, applied by reason of the electro-magnet P becoming de-energized and inert through interruption of the circuit in which it is included. The circuit being broken at the contact strip T, no further movement in that direction can be secured, nor can the motor circuit be again completed except by moving the hand lever or switch V in the reverse direction, so as to bring block $e$ into contact with segment $i$, and block $f$ into contact with segments $h$, $j$, whereupon the circuit will be completed from the positive pole of the source of supply, to block $e$, to segment $i$, by conductor to commutator brush $k'$ of the motor B, through armature to the brush $k$, thence by conductor to segment $j$, through block $f$ to segment $h$, and by conductor to strip or bar U, with which the tongue M' of switch M remains in contact, notwithstanding the fact that contact with strip T is destroyed. From yoke M the current passes to the fields K of the motor, thence to the helix of solenoid or electro magnet P, and finally back to the negative pole of the generator in the same direction as under the first adjustment of lever V. Thus it will be seen that changing the position of lever V causes the current to be reversed in the armature of the motor, without being reversed in the fields or in the brake magnet; hence the direction of rotation of the motor will be reversed with the reversal of lever V, but the brake will act precisely the same under both adjustments of the lever. As the motor goes into action it causes the trip drum I to rotate in a direction to pay off the trip chain H to the required extent, during which operation the arm Q travels back along the screw $d$ toward the armature, again bridging the bars or contact strips T and U. In the event of failure of the attendant to stop the motor at the proper time, the arm Q rides off the bar U and interrupts the circuit in the manner already described, but maintains contact with contact strip or bar T, so that upon reversing lever V the circuit will again be completed in the way and by the path first explained. The instant the current is interrupted, the brake is again applied automatically, and the armature is promptly brought to rest. By throwing lever V to an intermediate position between the segments, as indicated in Fig. 3, the current may be interrupted and the motor brought to rest, and by setting it over to one or the other side the motor may be caused to rotate in either direction at will and to the full extent desired, though overrunning is impossible. The number of turns in either direction may be determined by the space between the arms of yoke M, the length and extent of overlapping of bars T and U, or in any equivalent way.

In practice it will be advisable to provide the switch M M' with a spring or equivalent device for effecting a sudden break, to prevent burning of the contacts; but any common type of "snap" switch may be employed.

The invention is susceptible of considerable variation in embodiment without departure from the spirit and scope thereof; thus an oscillating switch or a sliding switch and gears, or other mechanism may be substituted for the screw to move the switch; or the screw may be upon a separate shaft geared to the shaft of the motor. So too, the brake may be applied to any shaft from that of the motor to that of the drum, and a spring may be substituted for the weight to actuate or apply the brake, or like modifications may be made.

It is to be understood that the tripping mechanism illustrated is merely adopted as one of many types, for convenience of illustrating my invention as practically embodied; and similarly, the automatic brake is in itself a well known contrivance and is here claimed only as an element of a combination of parts or devices, as hereinafter set forth.

The switch mechanism may obviously be combined with any electric motor requiring to run only a limited distance in either direction, whether in connection with hoisting apparatus or other machinery.

It is to be observed that under my construction and arrangement the automatic switch mechanism is connected with and directly operated by the motor, and is not actuated by the lifting device or carrier. It therefore becomes in effect a part of the motor, and will prevent overrunning of the motor in either direction, regardless of the rise or fall of the load. This is important, particularly in the relation in which this invention is primarily designed to be used, because the load or load-carrying device does not always rise and fall a given distance; yet it is important that the motor run only a given distance in any event.

Having thus described my invention, what I claim is—

1. In combination with an electric motor, a double switch and circuit breaker actuated by said motor and adapted to close one circuit through the switch before opening another; a second double switch adapted to be operated by hand, and double circuit connections between the two switches, substantially as shown and described; whereby the motor-controlled switch is caused to interrupt the operative circuit connection when the motor has operated sufficiently in one direction, and the manually-controlled switch is caused to close the second circuit connection simultaneously with reversal of the motor current.

2. In combination with an electric motor, an automatic brake therefor, an electro-magnet in circuit with the motor and adapted to withdraw the brake, and a circuit breaker connected with and directly actuated by the motor and serving to interrupt the current supplying the motor and the brake magnet, and thereby to permit the application of the brake whenever the motor has operated to a predetermined extent in either direction.

3. In combination with an electric motor, a reversing switch, a circuit breaker actuated by the motor, and two independent conductors connecting the reversing switch and the circuit breaker, substantially as shown; whereby, in the event of the operative circuit being broken by the circuit breaker, a second circuit may be completed in the reverse direction by actuating the reversing switch and reversing the motor.

4. In combination with a reversible electric motor and its supply conductors, an electrically controlled brake included in the motor circuit, a circuit breaker directly applied to and actuated by the motor and serving to interrupt the circuit of the motor and brake whenever the motor has operated to a predetermined extent in either direction; and a reversing switch adapted to reverse the direction of the current through the armature of the motor without reversing that of the fields or of the brake.

5. In combination with motor B, contact breaker M M' actuated thereby, and contact bars T, U,— reversing switch V, comprising contacts $e, f, g, h, i$ and $j$, and a divided or double circuit connection between the switch and the circuit breaker, substantially as described and shown.

6. In combination with motor B, and with a source of electric energy, a circuit breaker actuated by said motor and comprising a movable member M M' and bars T and U; a reversing switch comprising movable contacts $e, f$, and fixed contacts $g, h, i$ and $j$; a conductor connecting the block $e$ with one pole of the supply, conductors connecting the contacts $i, j$ with the brushes $k'$ and $k$ of the motor, conductors connecting the contacts $g$ and $h$ with the bars T and U and a conductor connecting the movable member M M' with the negative pole of the supply.

7. In combination with motor B, and with a source of electric energy, a circuit breaker actuated by said motor and comprising a movable member M M' and bars T and U; a reversing switch comprising movable contacts $e, f$, and fixed contacts $g, h, i$ and $j$; a conductor connecting the block $e$ with one pole of the supply; conductors connecting the contacts $i, j$ with the brushes $k'$ and $k$ of the motor; conductors connecting the contacts $g$ and $h$ with the bars T and U; and a conductor connecting the movable member M M' with the negative pole of the supply, and including the field of the motor.

8. In combination with motor B, and with a source of electric energy, an electrically controlled automatic brake; a circuit breaker actuated by said motor and comprising a movable member M M' and bars T and U; a reversing switch comprising movable contacts $e, f$, and fixed contacts $g, h, i$ and $j$; a conductor connecting the block $e$ with one pole of the supply; conductors connecting the contacts $i, j$, with the brushes $k'$ and $k$ of the motor; conductors connecting the contacts $g$ and $h$ with the bars T and U; and a conductor connecting the movable member M M' with the negative pole of the supply, and including the fields of the motor and the brake magnet helix.

9. In combination with motor B, and with a source of electric energy, an electrically controlled automatic brake; a circuit breaker actuated by said motor and comprising a movable member M M' and bars T and U; a reversing switch comprising movable contacts $e$, $f$, and fixed contacts $g$, $h$, $i$ and $j$; a conductor connecting the block $e$ with one pole of the supply; conductors connecting the contacts $i$, $j$, with the brushes $k'$ and $k$ of the motor; conductors connecting the contacts $g$ and $h$ with the bars T and U; and a conductor connecting the movable member M M' with the negative pole of the supply, and including the brake magnet helix.

In witness whereof I hereunto set my hand in the presence of two witnesses.

HARRY SAWYER.

Witnesses:
R. A. FLEMING,
CLAUDE BEARDSLEY.